United States Patent
Medoro et al.

(10) Patent No.: US 11,292,001 B2
(45) Date of Patent: Apr. 5, 2022

(54) MICROFLUIDIC SYSTEM AND METHOD FOR THE RECOVERY OF PARTICLES

(71) Applicant: Menarini Silicon Biosystems S.p.A., Castel Maggiore (IT)

(72) Inventors: Gianni Medoro, Casalecchio di Reno (IT); Alex Calanca, Mirandola (IT)

(73) Assignee: Menarini Silicon Biosystems S.p.A., Castel Maggiore (IT)

( * ) Notice: Subject to any disclaimer, the term of this patent is extended or adjusted under 35 U.S.C. 154(b) by 184 days.

(21) Appl. No.: 16/648,646

(22) PCT Filed: Sep. 21, 2018

(86) PCT No.: PCT/IB2018/057312
§ 371 (c)(1),
(2) Date: Mar. 18, 2020

(87) PCT Pub. No.: WO2019/058326
PCT Pub. Date: Mar. 28, 2019

(65) Prior Publication Data
US 2020/0276585 A1    Sep. 3, 2020

(30) Foreign Application Priority Data

Sep. 21, 2017    (IT) .......................... 102017000105948

(51) Int. Cl.
*B01L 3/00*    (2006.01)
(52) U.S. Cl.
CPC ..... *B01L 3/502761* (2013.01); *B01L 3/50273* (2013.01); *B01L 3/502746* (2013.01);
(Continued)
(58) Field of Classification Search
CPC ....... B01L 2200/027; B01L 2200/0621; B01L 2200/0668; B01L 2300/0663;
(Continued)

(56) References Cited

U.S. PATENT DOCUMENTS

| 2010/0044232 | A1 | 2/2010 | Lin et al. |
| 2012/0184010 | A1* | 7/2012 | Medoro ................ B03C 5/026 435/173.9 |

(Continued)

FOREIGN PATENT DOCUMENTS

| WO | WO-00/69565 A1 | 11/2000 |
| WO | WO-2007/010367 A2 | 1/2007 |

(Continued)

OTHER PUBLICATIONS

International Search Report and Written Opinion, corresponding International Application No. PCT/IB2018/057312, dated Jan. 14, 2019.

(Continued)

*Primary Examiner* — Jennifer Wecker
*Assistant Examiner* — Jonathan Bortoli
(74) *Attorney, Agent, or Firm* — Marshall, Gerstein & Borun LLP

(57) ABSTRACT

A microfluidic system and method for the recovery of particles; the system comprises at least one standing chamber, at least one outlet, at least one inlet and a moving assembly, which is adapted to move the particles; a fluid is fed from the inlet to the outlet so as to generate a substantially continuous flow of the fluid; a given particle of a group of particles arranged in the collecting chamber is moved selectively with respect to the other particles of the assembly to a release area, in which a dragging force created by the fluid flow is such as to move the particle towards the outlet.

25 Claims, 10 Drawing Sheets

(52) U.S. Cl.
CPC ............... *B01L 2200/027* (2013.01); *B01L 2200/0668* (2013.01); *B01L 2400/043* (2013.01); *B01L 2400/0415* (2013.01); *B01L 2400/0436* (2013.01); *B01L 2400/0451* (2013.01)

(58) Field of Classification Search
CPC ..... B01L 2300/0816; B01L 2400/0415; B01L 2400/0421; B01L 2400/0424; B01L 2400/043; B01L 2400/0436; B01L 2400/0451; B01L 2400/0487; B01L 3/50273; B01L 3/502746; B01L 3/502761; G01N 2015/1081
See application file for complete search history.

(56) References Cited

U.S. PATENT DOCUMENTS

| | | |
|---|---|---|
| 2015/0165346 A1 | 6/2015 | Puleo et al. |
| 2015/0198517 A1 | 7/2015 | Simpson et al. |
| 2016/0016180 A1 | 1/2016 | Lopez et al. |

FOREIGN PATENT DOCUMENTS

| | | |
|---|---|---|
| WO | WO-2007/049120 A2 | 5/2007 |
| WO | WO-2010/106426 A1 | 9/2010 |
| WO | WO-2010/106428 A2 | 9/2010 |
| WO | WO-2010/106434 A1 | 9/2010 |
| WO | WO-2012/085884 A1 | 6/2012 |

OTHER PUBLICATIONS

International Preliminary Report on Patentability, corresponding International Application No. PCT/IB2018/057312, dated Aug. 13, 2019.
Zhang et al., "Optical tweezers for single cells" Published online Apr. 1, 2008. doi:10.1098/rsif.2008.0052 (<http://www.ncbi.nlm.nih.gov/pmc/articles/PMC2408388/>).
Lenshof A., Laurell T., "Continuous separation of cells and particles in microfluidic systems", Chemical Society Reviews, 39 (2010) 1203-1217.
Laurell T., Petersson F., Nilsson A., "Chip integrated strategies for acoustic separation and manipulation of cells and particles", Chemical Society Reviews, 36 (2007) 429-506.
Wyatt Shields IV, Dr. Catherine D. Reyes and Prof. Gabriel P. López, "Microfluidic Cell Sorting: A Review of the Advances in the Separation of Cells from Debulking to Rare Cell Isolation", Lab Chip. Feb. 16, 2015; 15(5): 1230-1249, doi: 10.1039/c4lc01246a.

\* cited by examiner

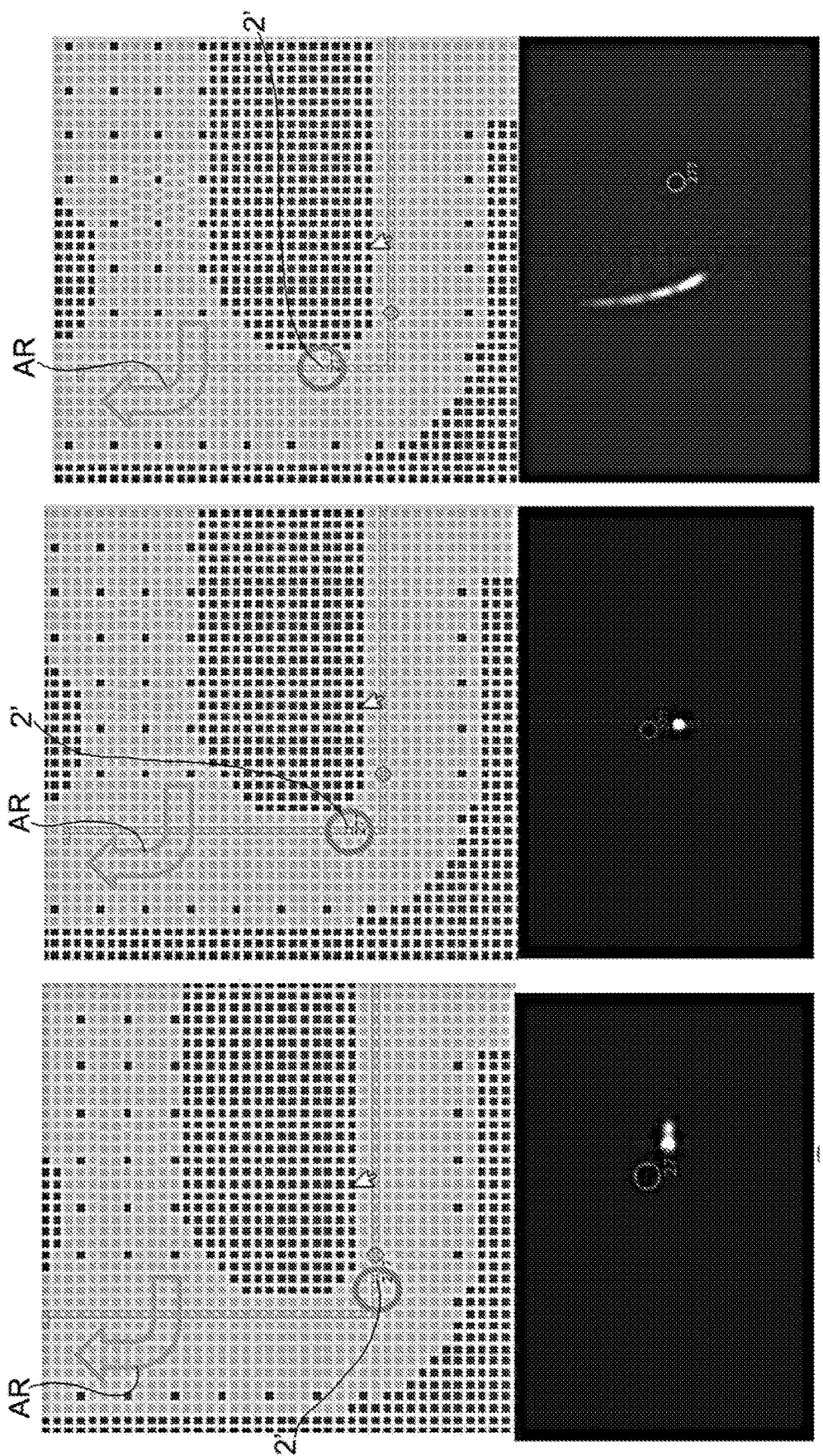

MICROFLUIDIC SYSTEM AND METHOD FOR THE RECOVERY OF PARTICLES

CROSS-REFERENCE TO RELATED APPLICATION

The present application is the U.S. national phase of International Patent Application No. PCT/IB2018/057312 filed Sep. 21, 2018, which claims the benefit of priority from Italian Patent Application No. 102017000105948 filed on Sep. 21, 2017, the respective disclosures of which are each incorporated herein by reference in their entireties.

TECHNICAL FIELD

The present invention relates to a microfluidic system and to a method for the recovery of particles.

BACKGROUND OF THE INVENTION

With particular reference to FIGS. 13 and 14, in the field of recovery of particles PP of small size from a sample, there are known systems comprising an inlet I, an outlet O and a moving assembly M, which is adapted to selectively move a particle PA in respect to other particles PP of a group di particles GP from a standing chamber SC to a recovery chamber RC. At this point, the feed of a liquid is started from the inlet I towards the outlet O so as to move the particle PA towards the outlet O. During movement of the particle PA from the standing chamber SC to the recovery chamber RC, liquid is not fed from the inlet I.

This type of system has various drawbacks, among which the following are cited.
- It is estimated that a time of around 107 seconds is required to recover each particle PA. This means that particularly long times are required to recover different particles. For example, the time required to recover 96 particles is around 3 hours.
- Repeating the procedure described above for each particle PA, liquid feed is activated and deactivated several times in succession, which can move and/or damage the particles PP arranged in the standing chamber SC.
- The succession of activations and deactivations of the liquid feeding system subjects this system to particular stress, which can result in damage during use, or otherwise (costly and complex) measures must be used to increase its strength.

The object of the present invention is to provide a microfluidic system and method for the recovery of particles with which it is possible to overcome, at least partially, the drawbacks of the prior art and which are, at the same time, easy and inexpensive to produce.

SUMMARY

According to the present invention, there are provided a microfluidic system and a method for the recovery of particles as claimed in the independent claims below and, preferably, in any one of the claims depending directly or indirectly on the independent claims.

Unless explicitly specified otherwise, in the present text the following terms have the meaning indicated below.

By equivalent diameter of a section it is meant the diameter of a circle having the same area as the section.

By microfluidic system it is meant a system comprising at least one microfluidic channel and/or at least one microfluidic chamber. Advantageously but not necessarily, the microfluidic system comprises at least one pump (more in particular, a plurality of pumps), at least one valve (more in particular, a plurality of valves) and optionally at least one gasket (more in particular, a plurality of gaskets).

In particular, by microfluidic channel it is meant a channel having a section with an equivalent diameter smaller than 0.5 mm.

In particular, the microfluidic chamber has a height smaller than 0.5 mm. More in particular, the microfluidic chamber has a width and a length larger than the height (more precisely but not necessarily, at least five times the height).

In the present text, by particle it is meant a corpuscle having the largest dimension smaller than 500 µm (advantageously smaller than 150 µm). According to some non-limiting examples, the particles are selected from: cells, cell debris (in particular cell fragments), cell clusters (such as, for example, small clusters of cells deriving from stem cells such as neurospheres or mammospheres) bacteria, lipospheres, microspheres (in polystyrene and/or magnetic), nanospheres (e.g. nanospheres up to 100 nm) complexes formed by microspheres bound to cells, and a combination thereof. Advantageously, the particles are cells.

According to some non-limiting embodiments, the particles (advantageously cells and/or cell debris) have the largest dimension smaller than 60 µm.

According to some specific non-limiting embodiments, the particles are selected from the group consisting of: tumour cells, white blood cells (WBC), stromal cells, spermatozoa, circulating tumour cells (CTC), spores, foetal cells, microspheres (micro-beads), liposomes, exosomes, epithelial cells, erythroblasts, trophoblasts, and a combination thereof. The dimensions of the particles can be measured in a standard manner with microscopes with graduated scale or normal microscopes used with slides (on which the particles are deposited) with a graduated scale.

In the present text, by dimensions of a particle we mean as the length, the width and the depth of the particle.

The expression "in a substantially selective manner" is used to identify a movement (or other similar terms indicating a movement) of particles in respect to other particles (which typically do not move). In particular, the particles that are moved and/or separated are particles largely of one or more given types. Advantageously but not necessarily, a substantially selective movement (or other similar terms indicating a movement and/or a separation) involves moving particles with at least 90% (advantageously 95%) of particles of the given type or types.

In the present text, the expressions "downstream" and "upstream" must be interpreted with reference to the direction of flow of the fluid (from the inlet to the outlet of the microfluidic system).

BRIEF DESCRIPTION OF THE FIGURES

The invention is described below with reference to the accompanying drawings, which illustrate some non-limiting embodiments, wherein:

FIGS. 8 to 10 are photographs showing subsequent steps of the operation of the system of FIGS. 3 and 4;

DETAILED DESCRIPTION

Figure 1:
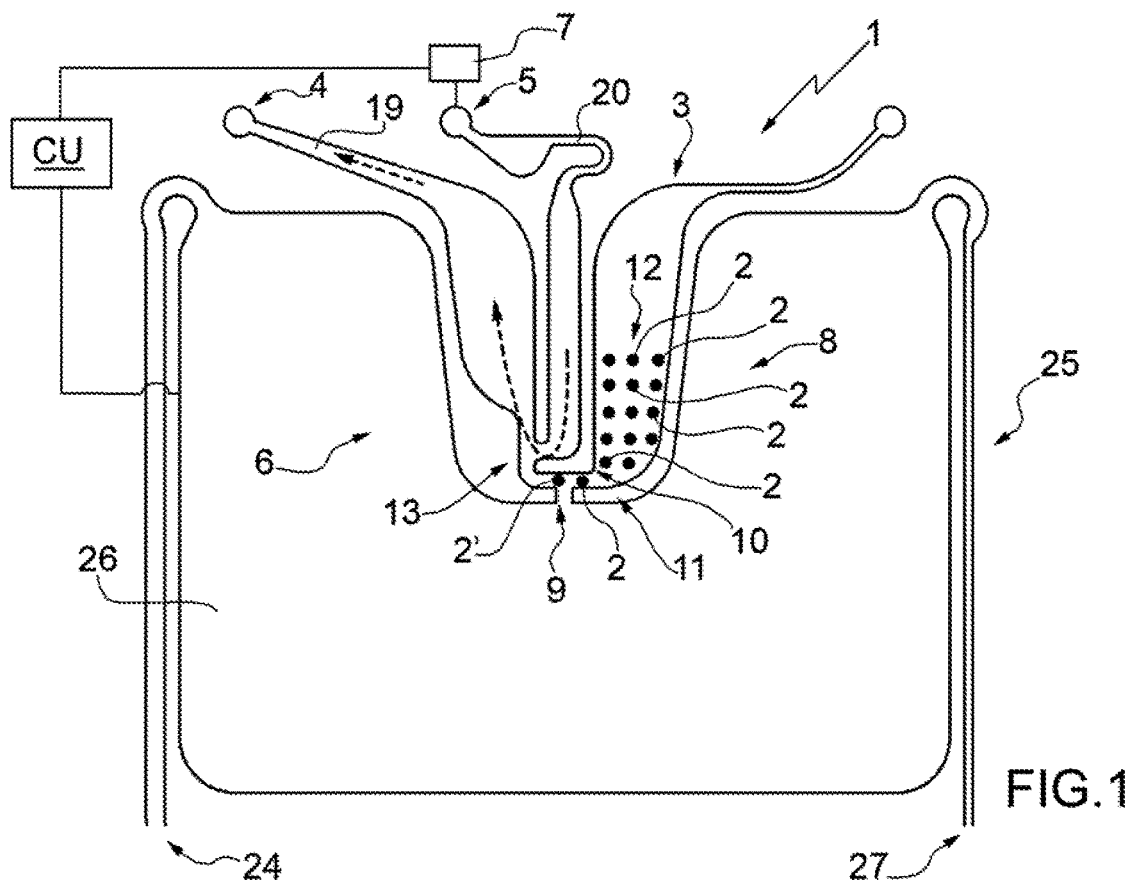
FIGS. 1 and 2 are schematic and plan views of a system according to the present invention in subsequent operating steps.

In FIG. 1, the numeral 1 indicates as a whole a microfluidic system for the recovery of particles.

The system 1 comprises (at least) one collecting chamber 3, (at least) one outlet 4, (at least) one inlet 5 and (at least) one moving assembly 6, which is adapted to (selectively) move at least one given particle 2' (relative to other particles 2) (at least at the collecting chamber 3). The collecting chamber 3, the outlet 4 and the inlet 5 are fluidically connected to each other.

In particular, the system 1 further comprises a feeding device 7 (more in particular a pump; for example, a pressure and/or volumetric pump) to feed a fluid (more in particular, a liquid; even more in particular, a buffer solution; more precisely but not necessarily, an aqueous buffer solution) from the inlet 5 to the outlet 4 so as to generate a flow of the fluid. More precisely but not necessarily, the feeding device 7 is adapted to feed the fluid in a substantially continuous manner so as to generate a substantially continuous flow of the fluid.

In particular, the moving assembly 6 is adapted to exert a force upon (at least) the particle 2' so as to move (at least) the particle 2' of a group 8 of particles 2 (arranged in the collecting chamber 3) until it selectively reaches, relative to other particles 2 of the group 8, a release area 9 in which a dragging force created by the fluid flow is such as to move the given particle 2' towards the outlet 4.

According to some non-limiting embodiments, the moving assembly 6 is adapted to exert a selective force (relative to other particles 2) upon (at least) the particle 2' so as to move said particle 2' to the release area 9. More precisely but not necessarily, the moving assembly 6 is adapted to exert the selective force upon (at least) the particle 2' so as to move the particle 2' selectively with respect to the other particles 2 of the group 8.

By selective force on one or more particles it is meant a force that is exerted upon this/these particle/particles but not on one or more other particles.

Advantageously but not necessarily, the moving assembly 6 is adapted to move (at least) the particle 2' in an independent manner relative to other particles 2 of the group 8.

In use, having a substantially continuous flow of the fluid, it is possible to save time as several activities can be carried out simultaneously. In this way, the different parts of the system 1 and the particles 2 are subjected to less stress.

Advantageously but not necessarily, the collecting chamber 3 is provided with an opening 10, through which the particle 2' passes to move towards the outlet 4.

According to some non-limiting embodiments, the system 1 comprises a connection channel 11, which is arranged at an end of the collecting chamber 3 between the collecting chamber 3 and the outlet 4 and between the collecting chamber 3 and the inlet 5 so as to fluidically connect the collecting chamber 3 to the inlet 5 and to the outlet 4. In particular, the connection channel 11 is arranged at the opening 10. More precisely but not necessarily, the opening 10 is part of the connection channel 11.

More precisely but not necessarily, the connection channel 11 has a cross section smaller than the cross section of at least one part of the collecting chamber 3. This enables the perturbations inside the collecting chamber 3 to be reduced.

In particular, the collecting chamber 3 comprises a standing area 12, which is adapted to house the group 8 of particles 2 (and in which the dragging force is not sufficient to substantially move the particles 2 of the group 8 towards the outlet 4).

More precisely but not necessarily, the collecting chamber 3 is structured so that the dragging force is not sufficient to move the particles 2 of the group 8 arranged in the standing area 12 (towards the outlet 4).

According to some non-limiting embodiments, the connection channel 11 has a cross section smaller than the cross section of (at least) the standing area 12. In particular, the group 8 is maintained (by the moving assembly 6) substantially immobile in the standing area 12.

Advantageously but not necessarily, the system 1 comprises at least one joining area 13, which is arranged on the outside of the collecting chamber 3 and between the inlet 5 and the outlet 4 to establish a fluidic connection between the outlet 4 and the inlet 5. In particular, the joining area 13 is arranged on the outside collecting chamber 3 at the opening 10.

Advantageously but not necessarily, the system 1 comprises an outlet channel 19, which extends from the joining area 13 to said outlet 4 and has at least one side wall extending from the opening 10 towards the outlet 4 (on the side of the outlet 4). The system 1 comprises a moving-away system, which is adapted to move the given particle 2' away from the side wall, in particular towards the centre of the outlet channel 19.

The moving-away system can for example operate by means of dielectrophoresis, optical tweezers, magnetophoresis, acoustophoresis, travelling waves, thermal flow, local fluid movements generated by electro thermal flow and/or local fluid movements generated by electrohydrodynamic and/or inertial and/or hydrodynamic forces.

According to some non-limiting embodiments (see in particular FIGS. 1 and 3), the microfluidic system 1 comprises a control device CU, which is adapted to control the feeding device 7 and the moving assembly 6 so that the moving assembly 6 moves the particle 2' to the release area 9 while the feeding device 7 feeds the fluid from the inlet 5 to the outlet 4 (in particular, through the joining area 13).

According to some non-limiting embodiments, the release area 9 is arranged inside the collecting chamber 3 (in particular, at the connection channel 11).

According to alternative non-limiting embodiments, the release area 9 is arranged on the outside of the collecting chamber 3 (in particular, in the joining area 13).

Figure 5:
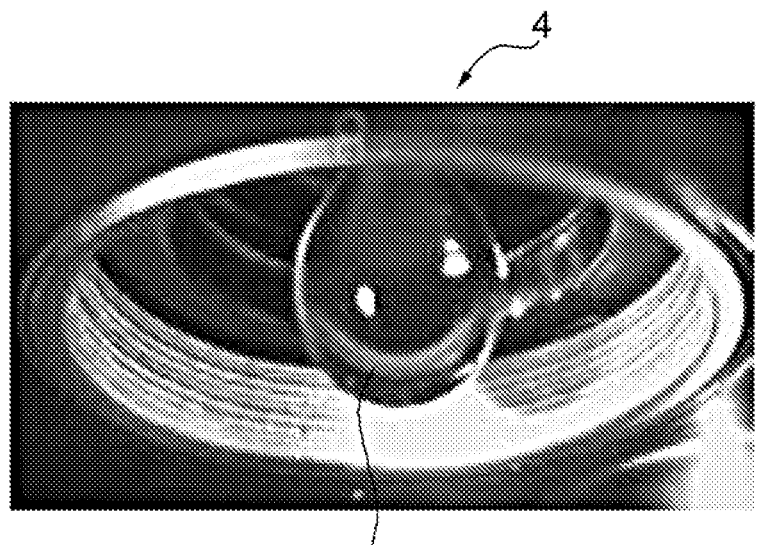
FIG. 5 is a photograph of a detail of the system of preceding figures.

Advantageously but not necessarily, the outlet 4 (more precisely but not necessarily, the outlet nozzle) is structured so that the fluid passes through the outlet 4 (comprising a nozzle shown by way of example in FIG. 5) so as to form a plurality of drops DR. In particular, the (relatively small) dimensions of the outlet 4 are such that the fluid that flows through the outlet 4 (comprising a nozzle shown by way of example in FIG. 5) forms a plurality of drops DR.

Even more advantageously but not necessarily, the outlet 4 (the nozzle) is structured so that the fluid flows through the outlet 4 so as to form a plurality of drops DR of 1-2 μL each. In this way it is possible to collect the particle 2' in a very limited volume, greatly facilitating the subsequent operations to handle and/or analyse the particle 2'.

Figure 7:
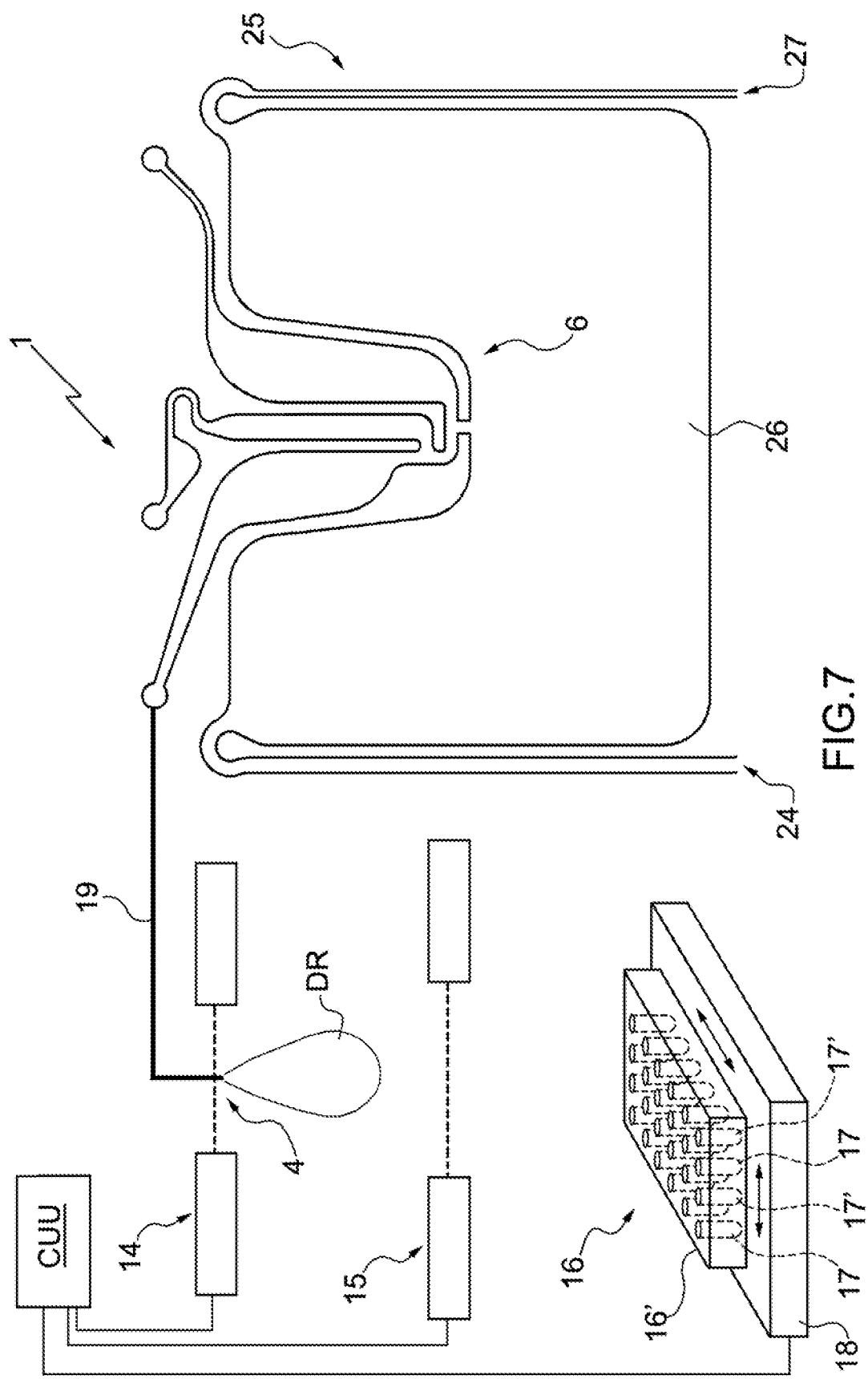
FIG. 7 schematically illustrates the system of FIGS. 1 and 2 or of FIGS. 3 and 4 with further details.

With particular reference to FIG. 7, advantageously but not necessarily, the system 1 comprises a detector 14 (for example comprising a microscope and/or optical sensors and/or electrical impedance sensors, for example produced with semiconductor technologies) to detect the passage of the particle 2' downstream of the collecting chamber 3 towards the outlet 4. Additionally or alternatively, the system 1 comprises a detector 15 to detect the emission of each drop DR from the outlet 4.

In particular, the system 1 also comprises a collection system 16, which comprises at least two separate containers 17 and 17' (in particular, a plurality of containers 17 and 17') and a moving device 18 to generate a relative movement between the containers 17 and 17' and the outlet 4 as a function of what detected by the detectors 14 and 15.

According to some non-limiting embodiments (such as the one illustrated in FIG. 7), the moving device 18 is adapted to (only) move the containers 17 and 17' as a function of what detected by the detectors 14 and 15.

Alternatively or additionally, the moving device 18 is adapted to move the outlet 4.

The presence of the detector 14 (and/or of the detector 15) is particularly advantageous when the drops DR are of limited size (1-2 μL). In this way, it is possible to select with high precision the drop DR containing the particle 2'.

According to some non-limiting embodiments, the system 1 also comprises a control unit CUU which is adapted to receive signals from the detector 14 (and from the detector 15) and to control the moving device 18 as a function of what detected by the detector 14 (and by the detector 15).

In particular, in accordance with one of the procedures according to which the system 1 can operate, when the detectors 14 and 15 detect the fall of a drop containing the particle 2', the control unit CUU operates the moving device 18 so as to move a container 17 or 17' under the outlet 4.

According to this procedure, advantageously but not necessarily, the drop/drops that (based on the data detected by the detector 14—and possibly by the detector 15) does/do not contain the particle/particles 2' is/are discarded. More precisely but not necessarily, the control unit CUU operates the moving device 18 so as to move a further container 17 or 17' under the outlet 4 (different from the container in which the drop/drops that contains/contain the particle/particles 2' is/are collected) when the detectors 14 and 15 detect the fall of the drop/drops that (based on the data detected by the detector 14—and possibly by the detector 15) does/do not contain the particle 2'.

Advantageously but not necessarily, the control unit CUU is part of the (or is coincident with) the control device CU.

Alternatively, the control unit CUU is separate from the control device CU.

In some non-limiting cases, the containers 17 and 17' are test tubes.

According to some non-limiting embodiments, the collection system 16 comprises a sample rack 16' that supports the containers 17 and 17'.

In particular, the moving device 18 (in particular a mobile support) is adapted to move the rack 16'. In this way, it is possible to decide which container 17 and 17' is to be arranged in a particular moment at (more precisely but not necessarily, below) the outlet 4.

In particular, the system 1 comprises an outlet channel 19, at an end of which there is arranged said outlet 4. More in particular, the detector 14 is arranged at the outlet channel 19.

In particular, the detector 15 is arranged below the outlet 4. According to some non-limiting embodiments (FIGS. 1-4), the microfluidic system 1 comprises an inlet channel 20, at an end of which there is arranged said inlet 5.

Figure 2:
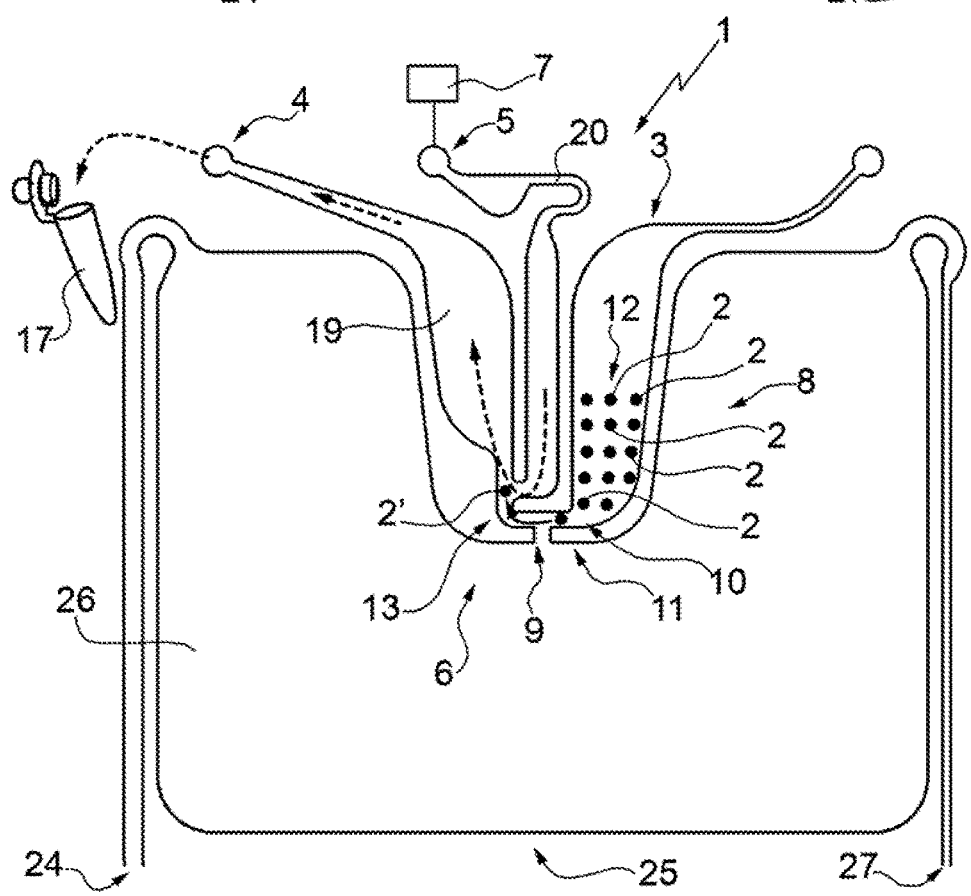

In the embodiment illustrated in FIGS. 1 and 2, the inlet channel 20 is arranged between the collecting chamber 3 and the outlet channel 19.

More precisely but not necessarily, FIG. 1 illustrates the particle 2' that reaches the release area 9; FIG. 2 illustrates the particle 2' being dragged by the fluid towards the outlet 4.

Figure 3:
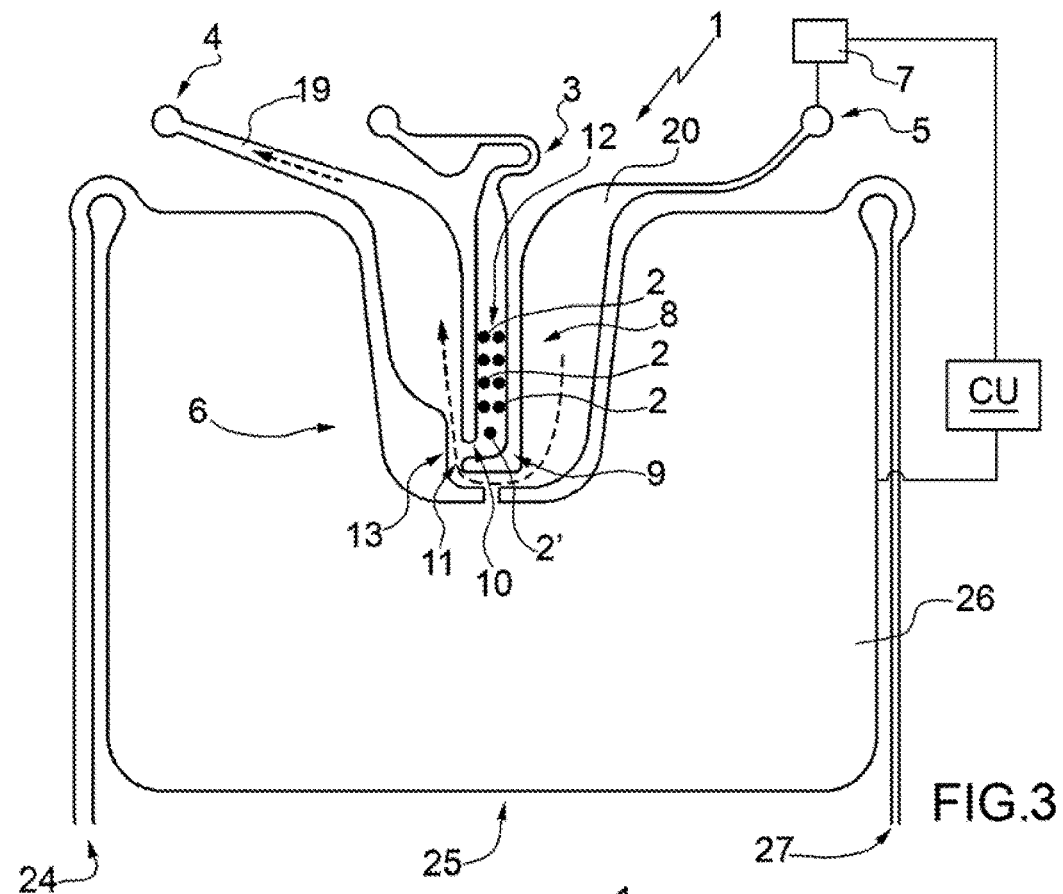
FIGS. 3 and 4 are schematic and plan views of a further embodiment of a system according to the present invention in subsequent operating steps.
Figure 4:
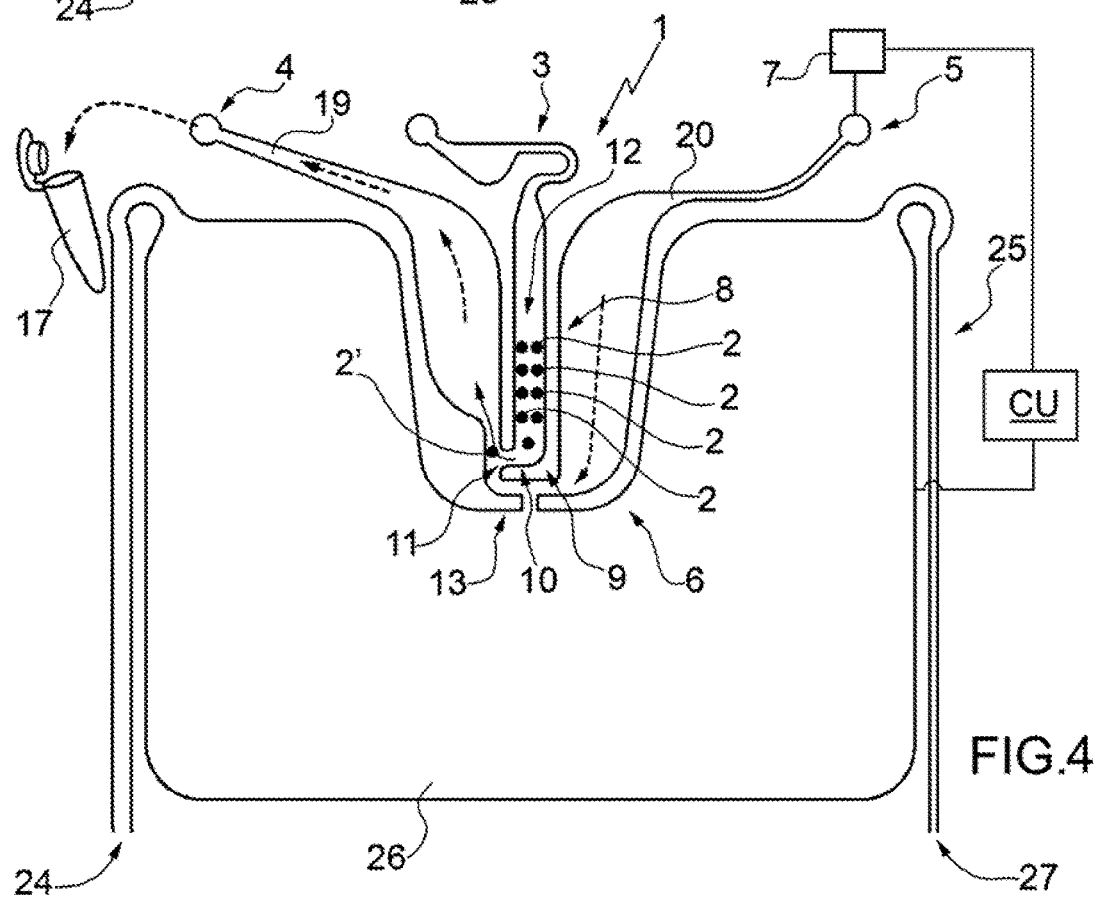

The embodiment illustrated in FIGS. 3 and 4 is substantially identical to the embodiment illustrated in FIGS. 1 and 2 and differs therefrom only in that the collecting chamber 3 is arranged between the inlet channel 20 and the outlet channel 19.

It was observed experimentally that this embodiment has some advantages. Among these, it must be underlined that, in this case, the distance between the standing area 12 and the release area is relatively small. In this way, transfer of the particle 2' from the standing area 12 to the release area 9 is limited and the possibilities that disturbances could somehow affect the particle 2' are reduced.

Advantageously but not necessarily, the speed of the flow of fluid is greater along the outlet channel 19 than in the joining area 13.

In this way, the risk of creating disturbances in the collecting chamber 3 (or in any case in the release area 9) is reduced, while at the same time allowing an increase in the recovery speed of the particle 2'.

Figure 12:
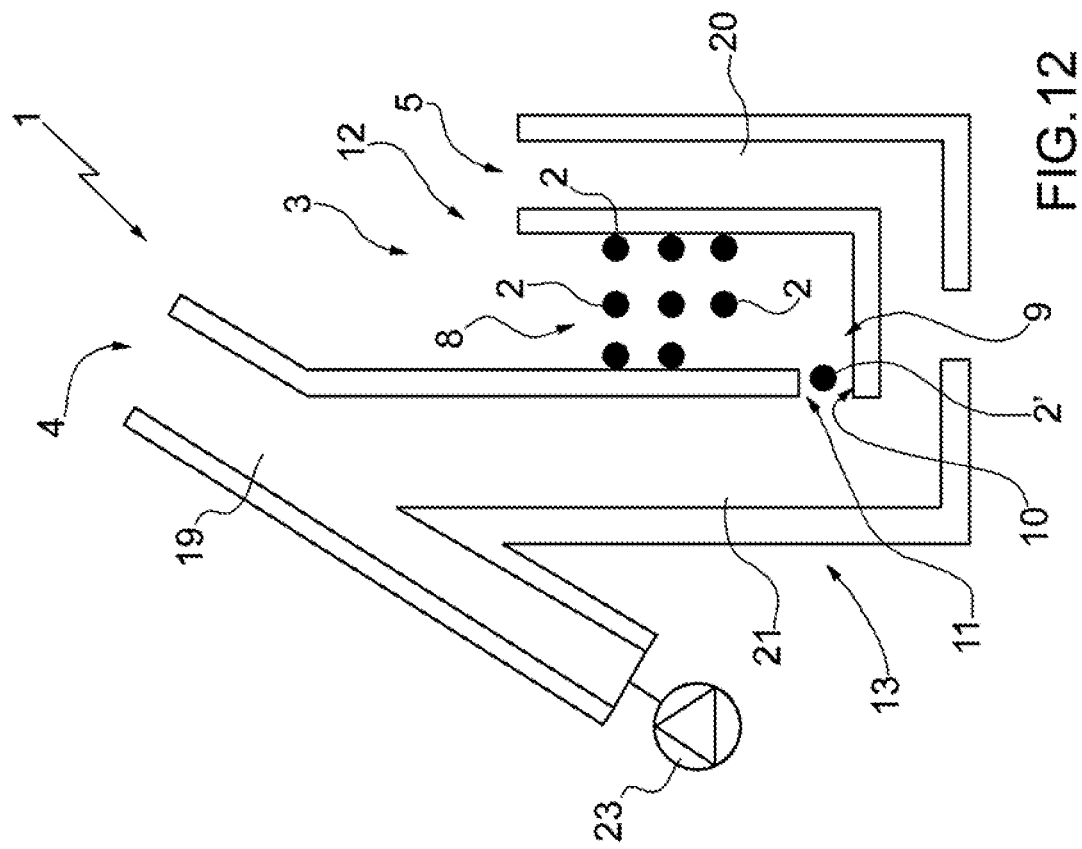
FIG. 12 is a schematic and plan view of a further embodiment of a system according to the present invention.
Figure 11:
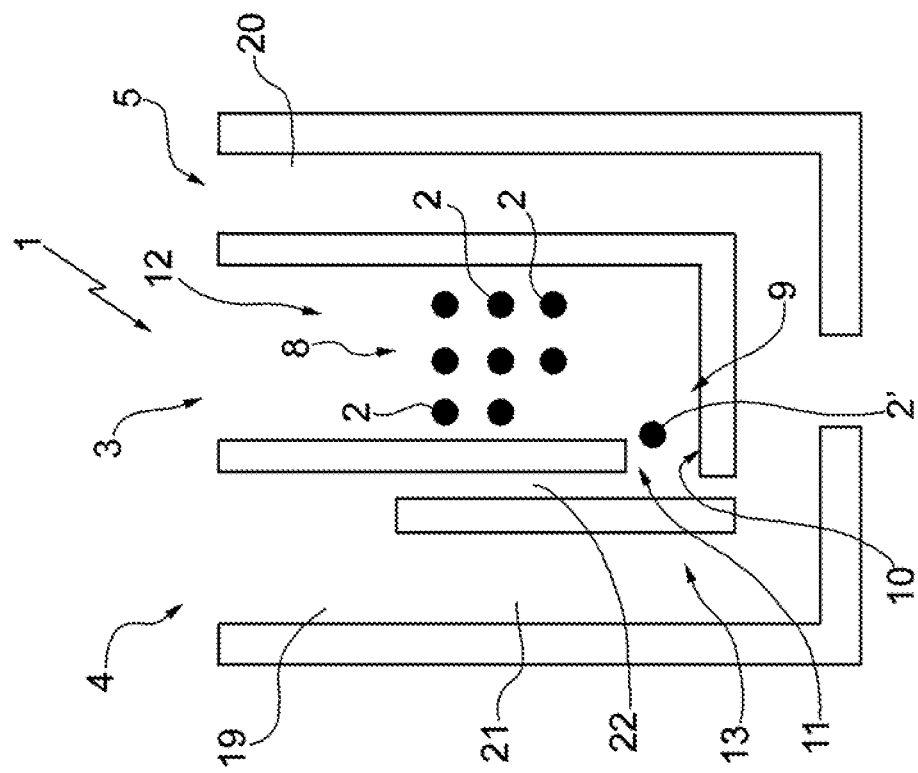
FIG. 11 is a schematic and plan view of a further embodiment of a system according to the present invention.
Figure 13:
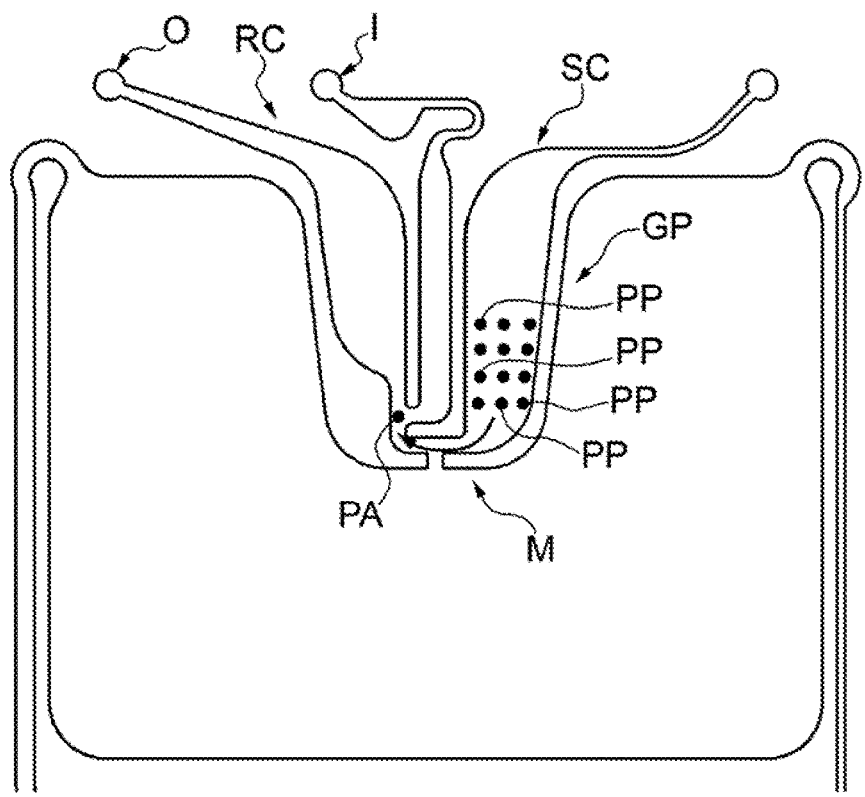
FIGS. 13 and 14 are schematic and plan views of a system of the state of the art in subsequent operating steps.
Figure 14:
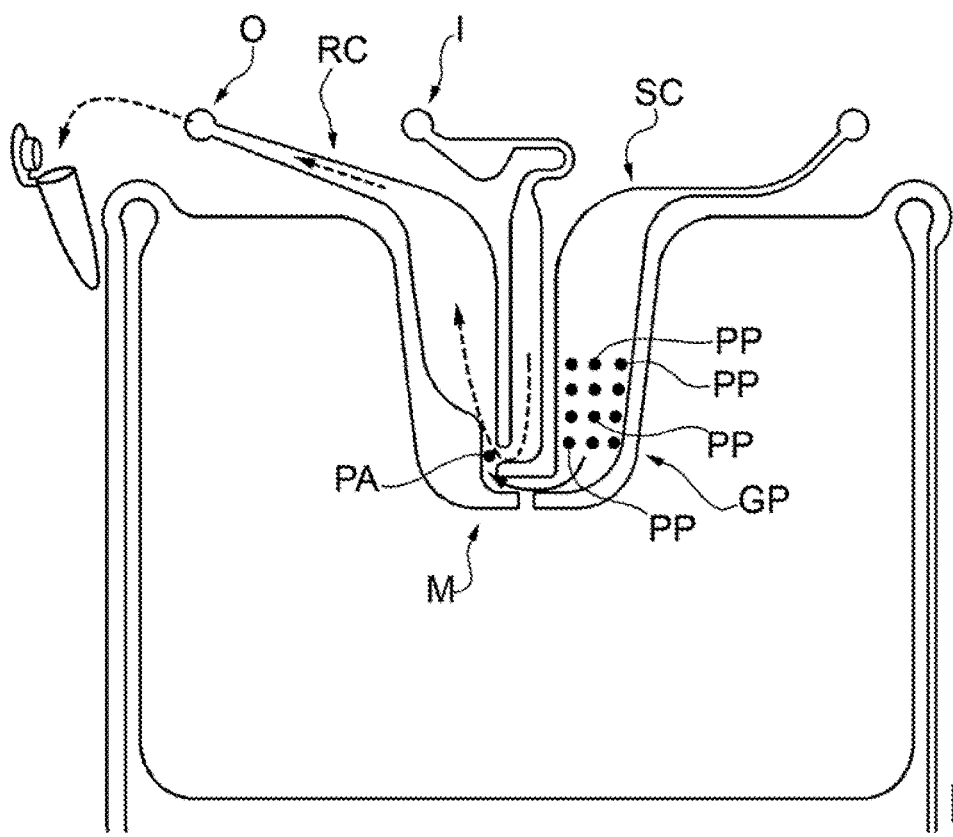

With particular reference to FIGS. 11 and 12, according to some non-limiting embodiments, the system 1 also comprises a connecting channel 21 arranged (in the joining area 13) between the inlet channel 20 and the outlet channel 19 to fluidically connect the inlet channel 20 to the outlet channel 19.

Advantageously but not necessarily, the connection channel 11 has a cross section smaller than the cross section of the connecting channel 21.

Alternatively or additionally, the connection channel 11 has a cross section smaller than the cross section of the outlet channel 19.

Alternatively or additionally, the connection channel 11 has a cross section smaller than the cross section of the inlet channel 20.

In particular, in some cases (such as the one illustrated in FIG. 11), the system 1 comprises an intermediate channel 22 arranged outside the collecting chamber 3 at the opening 10. The intermediate channel 22 has an inlet upstream of the opening 10 and an outlet downstream of the opening 10 so as to fluidically connect the inlet channel 20 to the outlet channel 19. More precisely but not necessarily, the intermediate channel 22 is arranged between the opening 10 and the connecting channel 21. More in particular, the joining area 13 is arranged in the intermediate channel 22.

Advantageously, but not necessarily, the intermediate channel 22 has a cross section smaller than the cross section of the connecting channel 21.

In this way the fluid flow from the inlet 5 to the outlet 4 has a speed smaller along the intermediate channel 22 and larger along the connecting channel 21, the inlet channel 20 and the outlet channel 19.

In other cases (such as the one illustrated in FIG. 12), the system 1 comprises a further feeding device 23 which is adapted to feed a further fluid (which can be the same as or different from the fluid previously described) through the outlet channel 19 (towards the outlet 4) at a larger speed to the speed at which the fluid is fed from the feeding device 7 through the inlet channel 20 and the connecting channel 21. In these cases, in particular, the joining area 13 is arranged in the connecting channel 21. Additionally or alternatively, the outlet channel 19 has an end opposite the outlet 4 connected to the feeding device 23. The connecting channel 21 is connected to an intermediate area of the outlet channel 19 arranged between the two ends.

According to some non-limiting embodiments, the moving assembly 6 comprises a system selected from the group consisting of: dielectrophoresis, optical tweezers, magnetophoresis, acoustophoresis, travelling waves, thermal flow, local fluid movements generated by electro thermal flow, local fluid movements generated by electrohydrodynamic forces, and a combination thereof.

In some non-limiting cases, the moving assembly 6 comprises a system selected from the group consisting of: dielectrophoresis, optical tweezers, magnetophoresis, acoustophoresis, and a combination thereof.

In particular, the moving assembly comprises a system able to exert a force directly upon the particle 2' (in particular, without the force being exerted upon the fluid that transfers the movement to the given particle 2').

According to specific embodiments, the moving assembly 6 comprises a dielectrophoresis unit (or system) for example as described in at least one of the patent applications WO-A-0069565, WO-A-2007010367, WO-A-2007049120. More in particular, the moving assembly 6 operates in accordance with the description of the patent applications with publication number WO2010/106434 and WO2012/085884).

Known systems are, for example, described in the following articles and in the documents cited therein: "Optical tweezers for single cells" Published online 2008 Apr. 1. doi:10.1098/rsif.2008.0052 (http://www.ncbi.nlm.nih.gov/pmc/articles/PMC2408388/); Lenshof A., Laurell T., "Continuous separation of cells and particles in microfluidic systems", Chemical Society Reviews, (2010) 1203-1217; Laurell T., Petersson F., Nilsson A., "Chip integrated strategies for acoustic separation and manipulation of cells and particles", Chemical Society Reviews, 36 (2007) 429-506; C. Wyatt Shields IV, Dr. Catherine D. Reyes and Prof. Gabriel P. Lopez, "Microfluidic Cell Sorting: A Review of the Advances in the Separation of Cells from Debulking to Rare Cell Isolation", Lab Chip. 2015 Feb. 16; 15(5): 1230-1249, doi: 10.1039/c41c01246a.

According to some non-limiting embodiments (FIGS. 1-4), the microfluidic system 1 comprises an inlet 24, through which, in use, a sample is inserted into the microfluidic system 1; a separation unit 25, which comprises the collecting chamber 3 and is adapted to transfer at least part of the particles 2 of a given type to the standing area 12 in a substantially selective manner relative to further particles (of different type) of the sample.

Advantageously but not necessarily, the separation unit 25 comprises a main chamber 26 and the collecting chamber 3 and is adapted to transfer at least part of the particles 2 of a given type from the main chamber 26 to the collecting chamber in a substantially selective manner relative to further particles (of a different type) of the sample.

Alternatively, the separation unit 25 is adapted to transfer at least part of the particles 2 of a given type to the standing area 12 from another area of the collecting chamber 3 in a substantially selective manner relative to further particles (of different type) of the sample.

According to some non-limiting embodiments, the separation unit 25 comprises a system selected from the group consisting of: dielectrophoresis, optical tweezers, magnetophoresis, acoustophoresis, travelling waves, thermal flow, local fluid movements generated by electro thermal flow, local fluid movements generated by electrohydrodynamic forces, and a combination thereof.

In some non-limiting cases, the separation unit 25 comprises a system selected from the group consisting of: dielectrophoresis, optical tweezers, magnetophoresis, acoustophoresis, and a combination thereof.

In particular, the separation unit 25 comprises a system able to exert a force directly upon the particles 2 (in particular, without the force being exerted upon the fluid, which transfers the movement to the given particle 2').

According to specific embodiments, the separation unit 25 comprises a dielectrophoresis unit (or system), for example as described in at least one of the patent applications WO-A-0069565, WO-A-2007010367, WO-A-2007049120. More in particular, the separation unit 25 operates in accordance with the description of the patent applications with publication number WO2010/106434 and WO2012/085884).

According to some non-limiting embodiments, the structure and the operation of the system 1 (excluding the foregoing description relative to the management of recovery of the particles 2 from the collecting chamber 3) is in accordance with the description in the patent applications with publication number WO2010/106428 and WO2010/106426.

In practice, according to some embodiments, in use, after the sample (or a portion thereof) is moved into the main chamber 26, the particles 2 of the given type are moved selectively (for example by means of dielectrophoresis) from the main chamber 26 to the collection chamber 3 (more precisely but not necessarily, to the standing area 12).

Figure 18:
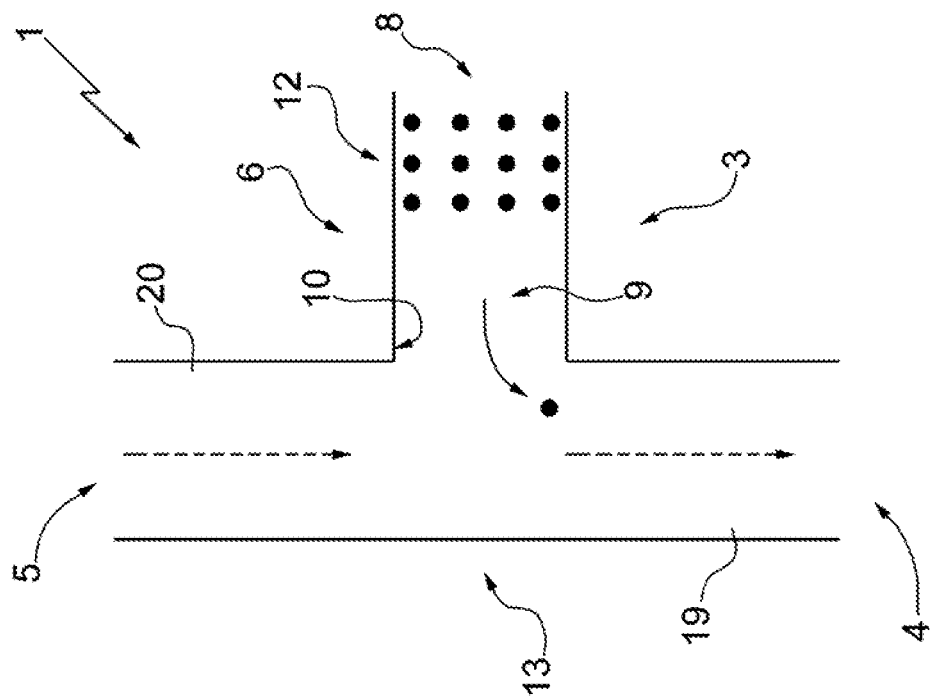
FIGS. 17 and 18 are schematic and plan views of a further embodiment of a system according to the present invention in subsequent operating steps.
Figure 17:
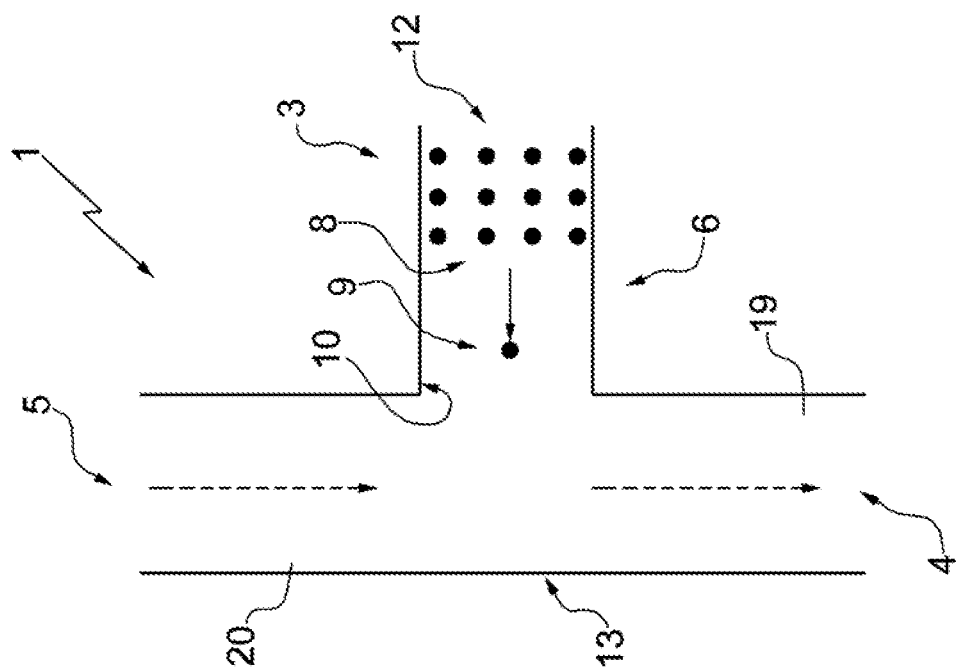

The embodiment illustrated in FIGS. 17 and 18 is substantially identical to the embodiment illustrated in FIGS. 3 and 2 and differs therefrom only in that it has no separation unit 25 (and therefore, among other things, no main chamber 26).

According to some non-limiting embodiments, the system 1 comprises a microfluidic device and an apparatus for the handling (isolation) of particles. Advantageously but not necessarily, the microfluidic device is of disposable type (in use, it comes into contact with the sample to be analysed) and is adapted to be inserted into the apparatus (which is instead re-usable). In particular, the microfluidic device and the apparatus are as described in the patent applications with publication number WO2010/106434 and WO2012/085884.

In accordance with a further aspect of the present invention, there is provided a method for the recovery of particles by means of a microfluidic system 1. Advantageously but not necessarily, the microfluidic system 1 is the same as the microfluidic system 1 described above.

More precisely but not necessarily, the microfluidic system 1 comprises (at least) one collecting chamber 3, (at least) one outlet 4, (at least) one inlet 5 and (at least) one moving assembly 6, which is adapted to (selectively) move at least one particle 2' (relative to the other particles 2) (at least at the collecting chamber 3). The collecting chamber 3, the outlet 4 and the inlet 5 are fluidically connected to one another.

The method comprises a feeding step, during which a fluid (in particular, a liquid; even more in particular, a buffer solution; more precisely but not necessarily, an aqueous buffer solution) is fed (in particular, in a substantially continuous manner) from the inlet 5 to the outlet 4 so as to generate a flow of the fluid; and a moving step, which takes place during (and simultaneously to at least part of) the feeding step and during which a (selective) force is exerted upon at least one particle 2' of a group 8 of particles 2 arranged in the collecting chamber 3 so as to move (at least) the particle 2' (relative to other particles 2) (at least at the collecting chamber 3).

In particular, during the moving step, the force is exerted upon (at least) the particle 2' so as to move (at least) the particle 2' until it selectively reaches a release area 9, relative to other particles 2 of the group 8, in which a dragging force created by the fluid flow is such as to move the given particle 2' towards the outlet 4.

More in particular, during the moving step, the force is exerted upon (at least) the particle 2' so as to move (at least) the particle 2' from a substantially immobile condition.

Advantageously but not necessarily, the collecting chamber 3 comprises a standing area 12, at which, in particular during (at least part of) the moving step (alternatively or additionally, during at least part of the feeding step), the group 8 of particles 2 is arranged and the dragging force is not sufficient to substantially move the particles 2 of the group of particles 8 towards the outlet 4.

According to some non-limiting embodiments, during the moving step, the dragging force created by the fluid flow is not sufficient to substantially move (at least part of) the group 8.

Alternatively or additionally, during the feeding step, the dragging force created by the fluid flow is not sufficient to substantially move (at least part of) the group 8.

In particular, during the moving step, (at least part of) the group 8 is maintained substantially immobile.

Alternatively or additionally, during the feeding step, (at least part of) the group 8 is maintained substantially immobile.

According to some non-limiting embodiments, during the moving step, a selective force (relative to other particles 2) is exerted upon (at least) the particle 2' so as to move the particle 2' to a release area 9. More precisely but not necessarily, the selective force is exerted upon (at least) the particle 2' so as to move the particle 2' selectively with respect to the other particles 2 of the group 8.

Advantageously but not necessarily, during the moving step, (at least) the particle 2' is moved in an independent manner relative to other particles 2 of the group 8.

FIGS. 8-10 are photographs taken by microscope during experimental trials of the method described above. The arrow AR indicates the direction of flow of the fluid.

Advantageously but not necessarily, the moving step is repeated several times (during a same feeding step), each for at least one further particle 2'.

In particular, the moving assembly 6 is adapted to exert said (selective) force.

According to some non-limiting embodiments, the moving step is carried out (by exerting the (selective) force upon the particle 2') by means of a system selected from the group consisting of: dielectrophoresis, optical tweezers, magneto-phoresis, acoustophoresis, travelling waves, thermal flow, local fluid movements generated by electro thermal flow, local fluid movements generated by electrohydrodynamic forces, and a combination thereof.

In some non-limiting cases, the system is selected from the group consisting of: dielectrophoresis, optical tweezers, magnetophoresis, acoustophoresis, and a combination thereof.

In particular, the moving step is carried out by exerting the (selective) force directly upon the particle 2' (in particular, without the force being exerted upon the fluid which transfers the movement to the particle 2').

Advantageously but not necessarily, the moving step is carried out by means of dielectrophoresis.

According to some non-limiting embodiments, the particle 2' can be selected deterministically in the group consisting of: images, immunofluorescence, impedance, dimensions, geometry, morphologic features, and a combination thereof.

In particular, during the feeding step, the fluid is fed (more precisely but not necessarily, in a substantially continuous manner) from the inlet 5 to the outlet 4 so as to generate a continuous flow of the fluid.

Advantageously but not necessarily, in the release area 9 the (selective) force is smaller than the dragging force.

Figure 6:
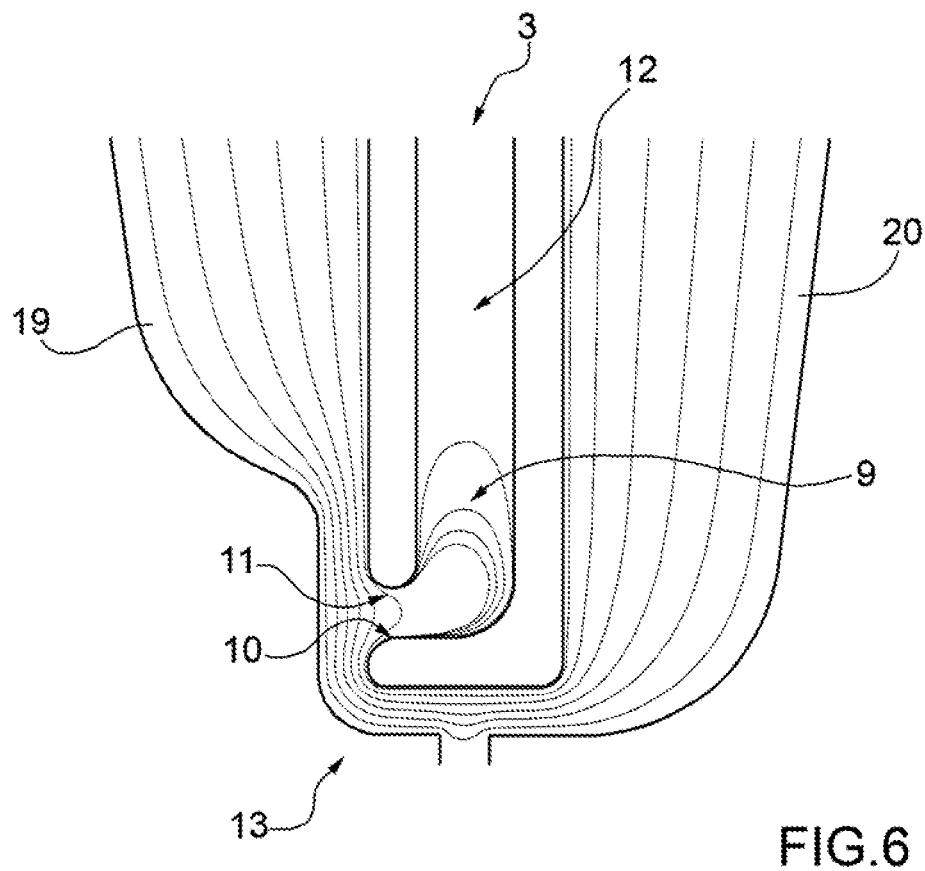
FIG. 6 schematically illustrates the lines of flow inside the system of FIGS. 3 and 4.

It should be noted that, purely by way of example, FIG. 6 illustrates the lines of the flow that generates the dragging force (due to movement of the fluid from the inlet 5 to the outlet 4).

Advantageously but not necessarily, the release area 9 is arranged inside of the collecting chamber 3. In this way, the particle 2' must travel a smaller distance during the moving step.

According to some non-limiting embodiments (in particular, see FIGS. 1-4 and 6), the microfluidic system 1 comprises at least one joining area 13, which is arranged between the inlet 5 and the outlet 4 to establish a fluidic connection between the outlet 4 and the inlet 5.

Advantageously but not necessarily (FIGS. 11 and 12), the flow of the fluid has a first speed in the joining area 13 and a second speed downstream of the joining area 13 (between the joining area 13 and the outlet 4). The first speed is smaller than the second speed.

In particular, the microfluidic system 1 comprises an outlet channel 19, at an end of which said outlet 4 is arranged, and an inlet channel 20, at an end of which said inlet 5 is arranged. During the feeding step the fluid is fed in succession, from said inlet 5, through the inlet channel 20, through the outlet channel 19 to said outlet 4.

According to some non-limiting embodiments, the microfluidic system 1 comprises an inlet 24, through which, in use, a sample is inserted into the microfluidic system 1; a separation unit 25, which comprises (a main chamber 26 and) the collecting chamber 3. In these cases, the method comprises an insertion step, during which at least one fraction of the sample is inserted into the separation unit 25; and at least one selection step, during which the particles 2 of a given type are moved (in particular, from the main chamber 26) into the collecting chamber 3 (in particular, into the standing area 12) in a substantially selective manner relative to further particles (of different type) of the sample.

According to some non-limiting embodiments, the method also comprises an outflow step, during which the fluid fed during the feeding step flows through the outlet 4 by forming a sequence of drops DR; a control step, during which the outflow of each drop is detected DR; a recovery step, during which a first given drop DR (containing the particle 2') is collected in a first container 17.

In particular, the method also comprises a moving step, during which a relative movement is generated between the containers 17 and 17' and the outlet 4 so that the first container 17 and the outlet 4 are moved away from one another and a second container 17' and the outlet 4 are moved towards one another as a function of what detected during the control step; and a further recovery step, during which a second drop DR is collected in the second container 17'.

According to some non-limiting embodiments (such as the one illustrated in FIG. 7), during the moving step (only) the containers 17 and 17' are moved as a function of what detected by the detectors 14 and 15. In other words, in these cases, during the moving step the first container 17 is moved away from the outlet 4 and a second container 17' is moved towards the outlet 4 as a function of what detected during the control step.

Alternatively or additionally, it is the outlet 4 that is moved.

Figure 15:
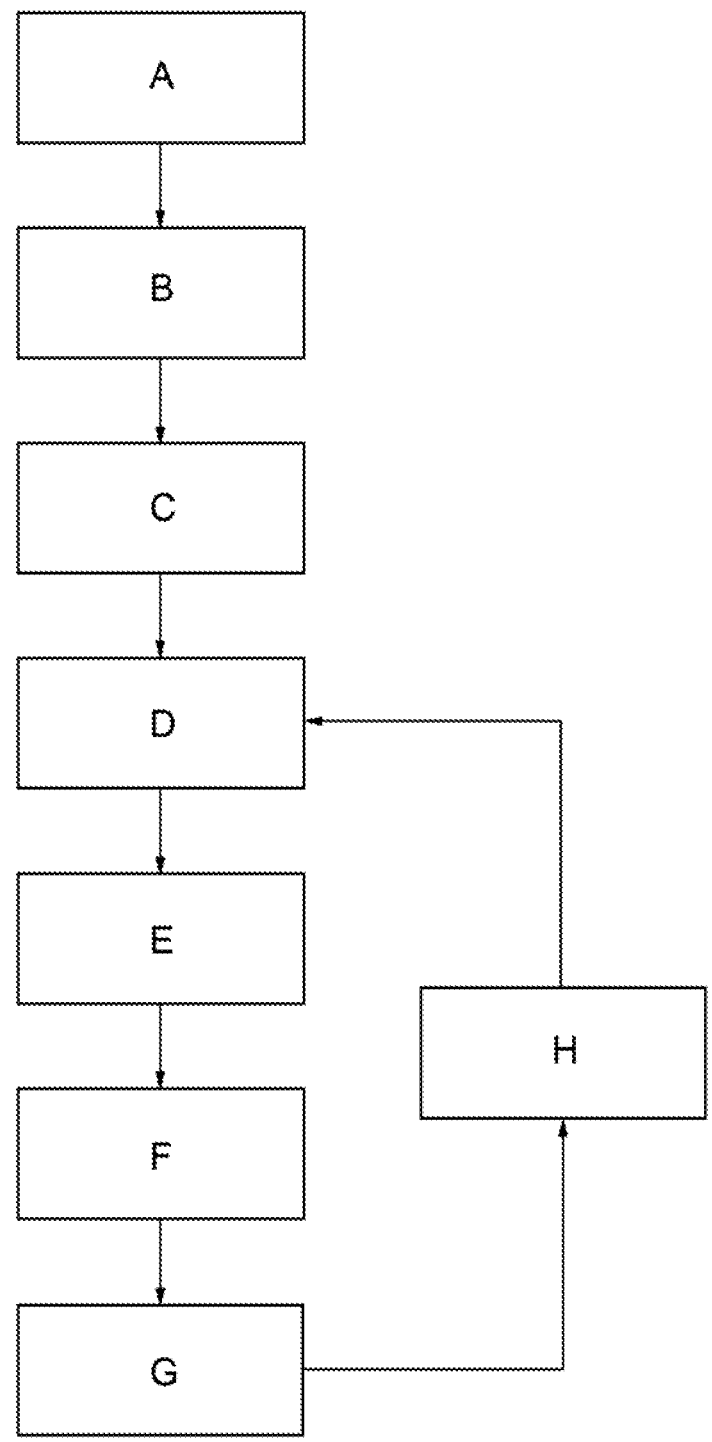
FIGS. 15 and 16 are flow diagrams of operating procedures of the system of one or more of FIGS. 1 to 12.

FIG. 15 schematically illustrates a flow chart of a specific and non-limiting example of procedure implemented in accordance with the method of the present invention.

The procedure, advantageously but not necessarily, provides for moving the particles 2 selectively in the collecting chamber 3 (step A) and for washing the main chamber 26 (step B). In particular, during step B, a further fluid (more precisely but not necessarily, a liquid; even more precisely but not necessarily, a buffer solution) is fed from the inlet 24, made to pass through the main chamber 26 and recovered through an outlet 27 (of the main chamber 26). The further fluid can be the same as or different from the above-mentioned fluid. In some specific cases, the further fluid has same composition as the above-mentioned fluid.

The procedure provides for generating a continuous flow of the fluid from the inlet 5 to the outlet 4 (step C), moving (simultaneously to step C) the particle 2' close to the release area 9 (step D), detecting the emission (fall) of (at least) one drop DR (step E) (by means of the detector 15), moving (simultaneously to step C and after or simultaneously to step E; in particular, after step E; more precisely but not necessarily, after a few seconds—e.g. from 0.1 to 60 seconds—from the end of step E) the particle 2' into the release area 9 (step F), dragging the particle 2' by means of the fluid (after step F and simultaneously to step C) until it is emitted inside a given drop DR (step G), positioning (before or simultaneously to step G) the correct container 17 at (more precisely but not necessarily, under) the outlet 4 (step H). At this point, steps D-H can be repeated for the recovery of other particles 2'.

Advantageously but not necessarily, the procedure provides that, in the first recovery cycle, the fluid is made to flow from the inlet 5 to the outlet 4 (to clean the path) without particles 2' (recovering at least one empty drop DR that falls from the outlet 4 into a container 17') (priming step). In particular, the empty drop/drops DR is/are discarded. According to some non-limiting embodiments, the priming step is repeated before each step C so as to clean (at least) between the collecting chamber 3 and the outlet 4.

According to some embodiments (additionally or alternatively), the method comprises an outflow step, during which the fluid fed during the feeding step flows through the outlet 4 forming a sequence of drops DR; and a recovery step, during which a given drop DR containing the particle 2' is collected separately from the other drops DR (in the container 17). Advantageously but not necessarily, the method comprises a detection step, during which the passage of the particle 2' downstream of the collecting chamber 3 towards the outlet 4 is detected.

In particular, the given drop DR is identified as a function of what detected during the detection step. More precisely but not necessarily, the given drop DR is identified based on when the passage of the particle 2' downstream of the collecting chamber 3 is detected. In other words, the portion of fluid that forms the given drop DR is identified as the one in which the particle 2' is present.

Advantageously but not necessarily, during the outflow step, the dragging force created by the fluid flow moves a further given particle 2' towards the outlet 4. In particular, during the outflow step, a further particle 2' is arranged (in the joining area 13 or) along the outlet channel 19.

According to some non-limiting embodiments, the method comprises both at least one detection step and at least one control step as described above.

Advantageously but not necessarily, the drops DR are 1-2 µL each.

According to some non-limiting embodiments, during the detection step, the particle 2' is detected deterministically selected from the group consisting of: optical (e.g. images, immunofluorescence), impedance, and a combination thereof.

In particular, the given drop DR is collected in a container 17, in which there are no other drops DR. In some cases, the steps described above are repeated several times. In these cases, according to some embodiments, it is possible to collect several given drops DR each containing a respective particle 2' in a same container 17. Alternatively, it is possible to collect each given drop DR containing a particle 2' in a respective container 17 (different for each given drop DR). Drops DR not containing particles are collected in one or more containers 17' different from the containers 17.

Advantageously but not necessarily, the method also comprises a control step, during which the outflow of each drop is detected (DR). In this way the recovery step can take place in a more precise manner.

Figure 16:
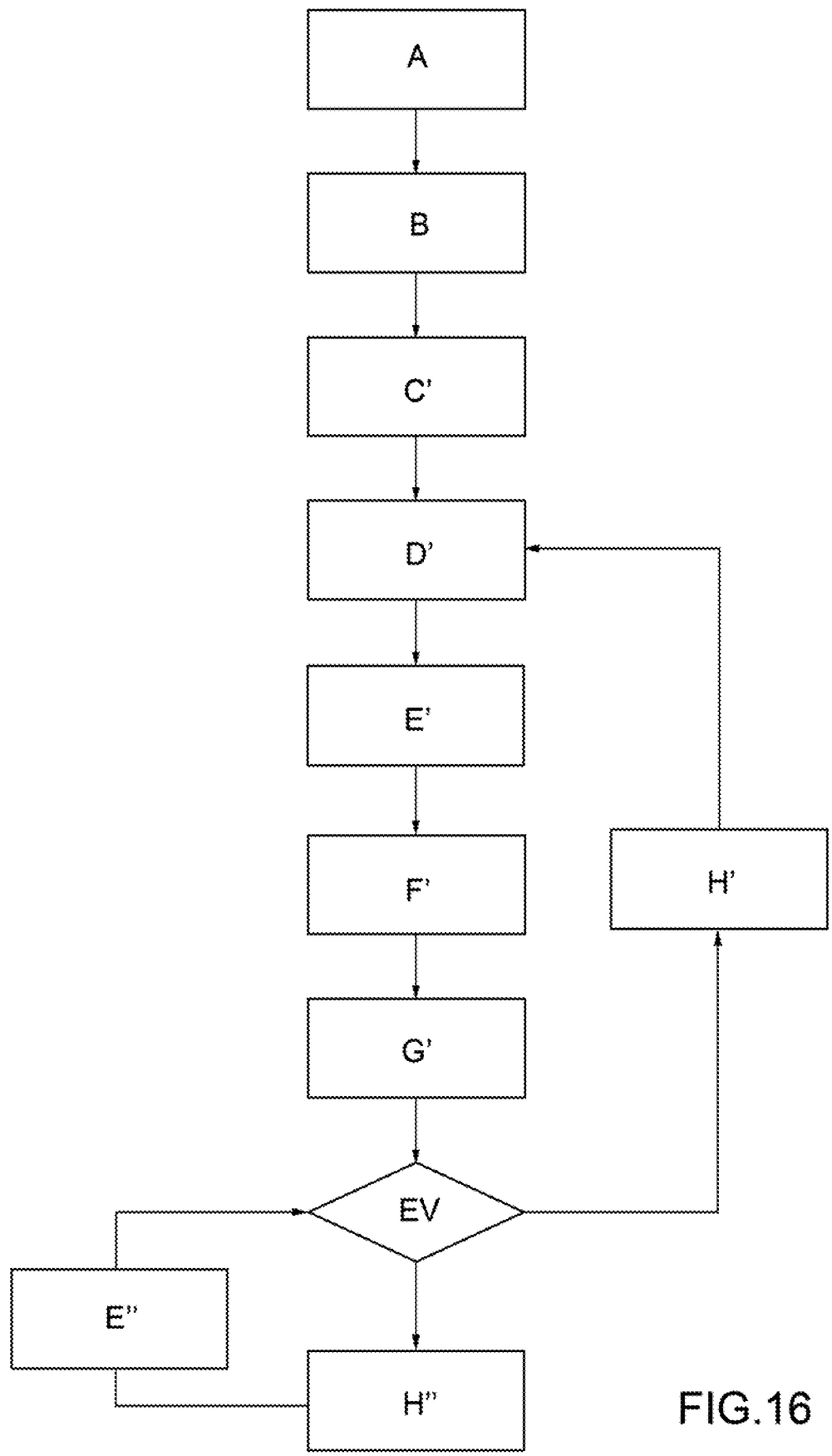

FIG. 16 schematically illustrates a flow chart of a specific and non-limiting example of procedure implemented in accordance with the method of the present invention.

The procedure, advantageously but not necessarily, provides for implementing steps A and B as described above.

The procedure provides for generating a continuous flow of the fluid from the inlet 5 to the outlet 4 (step C'), moving (simultaneously to step C') the particle 2' close to the release area 9 (step D'), detecting the emission (fall) of (at least) one drop DR (step E') (by means of the detector 15), moving (simultaneously to step C' and after or simultaneously to step E'; in particular, after step E'; more precisely but not necessarily, after a few seconds—e.g. from 0.1 to 60 seconds—from the end of step E') the particle 2' into the release area 9 (step F'), dragging (simultaneously to step C' and subsequently to step F') the particle 2' by means of the fluid until it is emitted inside a given drop DR (step G'), determining (based on the data detected by the detector 14 and, in particular, by the detector 15) whether a drop that falls from the outlet 4 contains the particle 2' (step EV).

If the result of step EV is positive, the procedure provides for positioning (before or simultaneously to step G') the correct container 17 at (more precisely but not necessarily, under) the outlet 4 (step H') so that the container 17 can receive the given drop DR containing the particle 2'; and detecting the emission (fall) of a drop DR (step E') (by means of the detector 15). At this point, advantageously but not necessarily, steps D', E', F', G' and EV (and optionally H') are repeated for the recovery of one or more other particles 2'.

If the result of step EV is negative, the procedure provides for positioning (before or simultaneously to step G') the correct container 17' at (more precisely but not necessarily, under) the outlet 4 (step H") so that the container 17' can receive the drop DR not containing the particle 2'. The procedure provides for detecting the emission (fall) of a drop DR (step E") (by means of the detector 15). At this point, the procedure continues with a new step EV.

With the method and the system according to the present invention it is possible to obtain various advantages compared to the state of the art. Among these, by way of example, the following are cited: the possibility of obtaining improved separation between different particles; the possibility of isolating a number of given particles (or also individually) in a (more) reliable manner; the possibility of recovering the particles (also individually) rapidly and reducing the risk of damage.

Unless explicitly indicated otherwise, the content of the references (articles, books, patent applications, etc.) cited in this text is considered integrated herein, in its entirety. In particular the references mentioned are incorporated herein by reference.

The invention claimed is:

1. A method for the recovery of particles by means of using a microfluidic system, which comprises at least one collecting chamber, at least one outlet, at least one inlet and a moving assembly, which is adapted to move at least one given particle at least at the collecting chamber; the collecting chamber, the outlet and the inlet are connected to one another in a fluidic manner;
    the method comprising:
        a feeding step, during which a fluid from the inlet to the outlet so as to generate a flow of the fluid;
        a moving step, which takes place during the feeding step and during which a force is exerted upon at least one given particle of a group of particles arranged in the collecting chamber so as to move at least the at least one given particle until it selectively reaches, relative to other particles of the group, a release area in which a dragging force created by the fluid flow is such as to move the at least one given particle towards the outlet,
        wherein the collecting chamber comprises a standing area, where the group of particles is arranged and the dragging force is not sufficient to substantially move the particles of the group of particles towards the outlet.

2. The method according to claim 1, wherein the moving step is carried out by exerting the force upon the at least one given particle using a system selected from the group consisting of: dielectrophoresis, optical tweezers, magnetophoresis, acoustophoresis, travelling waves, thermal flow, local fluid movements generated by electro thermal flow, local fluid movements generated by electrohydrodynamic forces, and a combination thereof.

3. The method according to claim 1, wherein the moving step is carried out by exerting the force directly upon the given particle.

4. The method according to claim 1, wherein, in the release area, the force is smaller than the dragging force; and the fluid is fed from the inlet to the outlet so as to generate a continuous flow of the fluid.

5. The method according to claim 1, wherein the release area is arranged inside the collecting chamber.

6. The method according to claim 1, wherein the microfluidic system further comprises at least one joining area, which is arranged on the outside of the collecting chamber and between the inlet and the outlet so as to establish a fluidic connection between the outlet and the inlet; the collecting chamber being provided with an opening, through which the given particle passes to move towards the outlet; the joining area being arranged on the outside of the collecting chamber in the area of the opening.

7. The method according to claim 1, wherein the microfluidic system further comprises at least one joining area, which is arranged between the inlet and the outlet so as to establish a fluidic connection between the outlet and the inlet; the fluid flow has a first speed in the joining area and a second speed downstream of the joining area; the first speed being smaller than the second speed.

8. The method according to claim 1, wherein the microfluidic system further comprises a connection channel, which is arranged at an end of the collecting chamber between the collecting chamber and the outlet and between the collecting chamber and the inlet so as to fluidically connect the collecting chamber to the inlet and to the outlet; the connection channel having a cross section that is smaller than the cross section of the standing area.

9. The method according to claim 1, further comprising:
    a detection step, during which the passage of the at least one given particle downstream of the collecting chamber towards the outlet is detected;
    an outflow step, during which at least part of the fluid fed during the feeding step flows through the outlet, thus forming a sequence of drops (DR); and
    a recovery step, during which at least one given drop (DR) containing said given particle is collected separately from the other drops (DR); the given drop (DR) being identified as a function of what detected during the detection step.

10. The method according to claim 1 further comprising:
    an outflow step, during which at least part of the fluid fed during the feeding step flows through the outlet, thus forming a sequence of drops (DR); a control step, during which the outflow of each drop (DR) is detected;
    a recovery step, during which a first drop (DR) is collected in a first container (17); a moving step, during which a relative movement is generated between the containers and the outlet so that the first container and the outlet are moved away from one another and at least one second container and the outlet are moved towards one another as a function of what detected during the control step; and
    a further recovery step, during which a second drop (DR) is collected in the second container.

11. A microfluidic system for the recovery of particles, comprising:
    one collecting chamber;
    at least one outlet;
    at least one inlet;
    a moving assembly, which is configured to move at least one given particle of a group of particles at least at the collecting chamber, wherein the moving assembly is configured to exert a force upon the at least one given particle until it selectively reaches a release area with respect to other particles of the group of particles;
    at least one feeding device to feed a fluid from the inlet to the outlet so as to generate a flow of the fluid, wherein the feeding device is configured to feed the fluid so as to generate a fluid flow from the inlet to the outlet;

wherein the release area is configured to create a dragging force wherein the dragging force created by the fluid flow in the release area moves the given particle towards the outlet; and a control device (CU) which is configured to control the feeding device and the moving assembly so that the moving assembly is configured to move the at least one given particle to the release area while the feeding device is configured to feed the fluid from the inlet to the outlet, wherein the collecting chamber comprises a standing area, which is configured to house the group of particles and where the dragging force is not sufficient to substantially move the particles of the group of particles towards the outlet.

12. The microfluidic system according to claim 11, wherein the moving assembly comprises a system selected from the group consisting of: dielectrophoresis, optical tweezers, magnetophoresis, acoustophoresis, travelling waves, thermal flow, local fluid movements generated by electro thermal flow, local fluid movements generated by electrohydrodynamic forces, and a combination thereof.

13. The system according to claim 11, wherein the moving assembly is adapted to exert the force directly upon the given particle.

14. The microfluidic system according to claim 11, further comprising at least one joining area, which is arranged on the outside of the collecting chamber and between the inlet and the outlet so as to establish a fluidic connection between the outlet and the inlet; the collecting chamber being provided with an opening, through which the given particle passes to move towards the outlet; the joining area being arranged on the outside of the collecting chamber in the area of the opening.

15. The microfluidic system according to claim 14, further comprising an outlet channel, which extends from the joining area to said outlet and has at least one side wall extending from said opening towards the outlet; the microfluidic system comprises a moving-away system, which is adapted to move the given particle away from the side wall towards the center of the outlet channel.

16. The microfluidic system according to claim 11, further comprising a connection channel, which is arranged at an end of the collecting chamber between the collecting chamber and the outlet and between the collecting chamber and the inlet so as to fluidically connect the collecting chamber to the inlet and to the outlet; the connection channel having a cross section that is smaller than the cross section of at least part of the collecting chamber; the connection channel having a cross section that is smaller than the cross section at least of the standing area.

17. The microfluidic system according to claim 11, wherein said outlet is structured so that at least part of the fluid flows through the outlet so as to form a plurality of drops (DR); and the microfluidic system further comprises a first detector to detect the passage of the given particle downstream of the collecting chamber towards the outlet; a second detector to detect the emission of each drop (DR) from the outlet; and a collecting system, which comprises at least two separate containers and a moving device to generate a relative movement between the containers and the outlet as a function of what detected by the first and second detector.

18. The microfluidic system according to claim 11 and comprising an inlet, through which, in use, a sample is inserted into the microfluidic system; a separation unit, which comprises the collecting chamber and is adapted to transfer at least part of the particles of a given type to a standing area of the collecting chamber in a substantially selective manner relative to further particles of the sample.

19. The method of claim 1, wherein the force is exerted upon the at least one given particle least partially simultaneous with the feeding of the fluid from the inlet to the outlet.

20. The method of claim 3, wherein the force is exerted upon the at least one given particle without the force being exerted upon the fluid that transfers movement to the at last one given particle.

21. The method of claim 3, wherein the force is exerted upon the at least one given particle such that the at least one given particle is moved independent relative to other particles of the group of particles.

22. The microfluidic system of claim 13, wherein the moving assembly is adapted to exert a force directly on the at least one given particle without the force being exerted upon the fluid that transfers the movement to the at least one given particle so as to move the at least one given particle in an independent manner relative to other particles of the group of particles.

23. The microfluidic system of claim 14, wherein the release area is arranged inside the colleting chamber; and the feeding device is adapted to feed the fluid in a substantially continuous manner so as to generate a substantially continuous flow of the fluid.

24. The microfluidic system of claim 17, wherein the microfluidic system further comprises an outlet channel at an end of which there is arranged said outlet; and the first detector is arranged in the area of the outlet channel.

25. The microfluidic system of claim 18, wherein the separation unit comprises a main chamber and is adapted to transfer at least part of the particles of a given type from the main chamber to the collecting chamber in a substantially selective manner relative to further particles of the sample.

* * * * *